(12) United States Patent
Pritchard et al.

(10) Patent No.: US 9,534,665 B1
(45) Date of Patent: Jan. 3, 2017

(54) ELECTRICAL ALL-WHEEL DRIVE

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/834,559

(22) Filed: Aug. 25, 2015

(51) Int. Cl.
  *F16H 3/46* (2006.01)
  *F16H 37/08* (2006.01)
(52) U.S. Cl.
  CPC ............ *F16H 3/46* (2013.01); *F16H 37/0813* (2013.01); *F16H 2200/0034* (2013.01); *F16H 2200/2005* (2013.01); *F16H 2200/2033* (2013.01)

(58) Field of Classification Search
  CPC ........................................................ F16H 3/46
  See application file for complete search history.

(56) References Cited

U.S. PATENT DOCUMENTS 7,276,008 B2 *  10/2007  Yasui .................... B60K 6/365
                                                           180/65.25

* cited by examiner

*Primary Examiner* — Derek D Knight
(74) *Attorney, Agent, or Firm* — BrooksGroup

(57) ABSTRACT

A number of variations may include a product that may include an axle assembly with an electrical machine that may be interconnected with the axle assembly. A power transfer unit may be connected between the electrical machine and the axle assembly. The power transfer unit may include a planetary gear set and may include an engagement mechanism that in combination may provide a low range, a neutral mode and a high range between the electrical machine and the axle assembly. A first gear set may be engaged between the electrical machine and the power transfer unit and a second gear set may be engaged between the power transfer unit and the axle assembly.

13 Claims, 2 Drawing Sheets

ELECTRICAL ALL-WHEEL DRIVE

TECHNICAL FIELD

The field to which the disclosure generally relates includes vehicle drivelines and more particularly, includes vehicle drivelines with electric drive capability.

BACKGROUND

Vehicle drivelines may include a combustion engine, an electric motor or another power plant for propulsion. Hybrid vehicles may include a combination of different types of power plants. An all-wheel drive vehicle may include a connection between each wheel and one or more power plants.

SUMMARY OF ILLUSTRATIVE VARIATIONS

According to a number of illustrative variations, a product may include product that may include an axle assembly with an electrical machine that may be interconnected with the axle assembly. A power transfer unit may be connected between the electrical machine and the axle assembly. The power transfer unit may include a planetary gear set and may include an engagement mechanism that in combination may provide a low range, a neutral mode and a high range between the electrical machine and the axle assembly. A first gear set may be engaged between the electrical machine and the power transfer unit and a second gear set may be engaged between the power transfer unit and the axle assembly.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
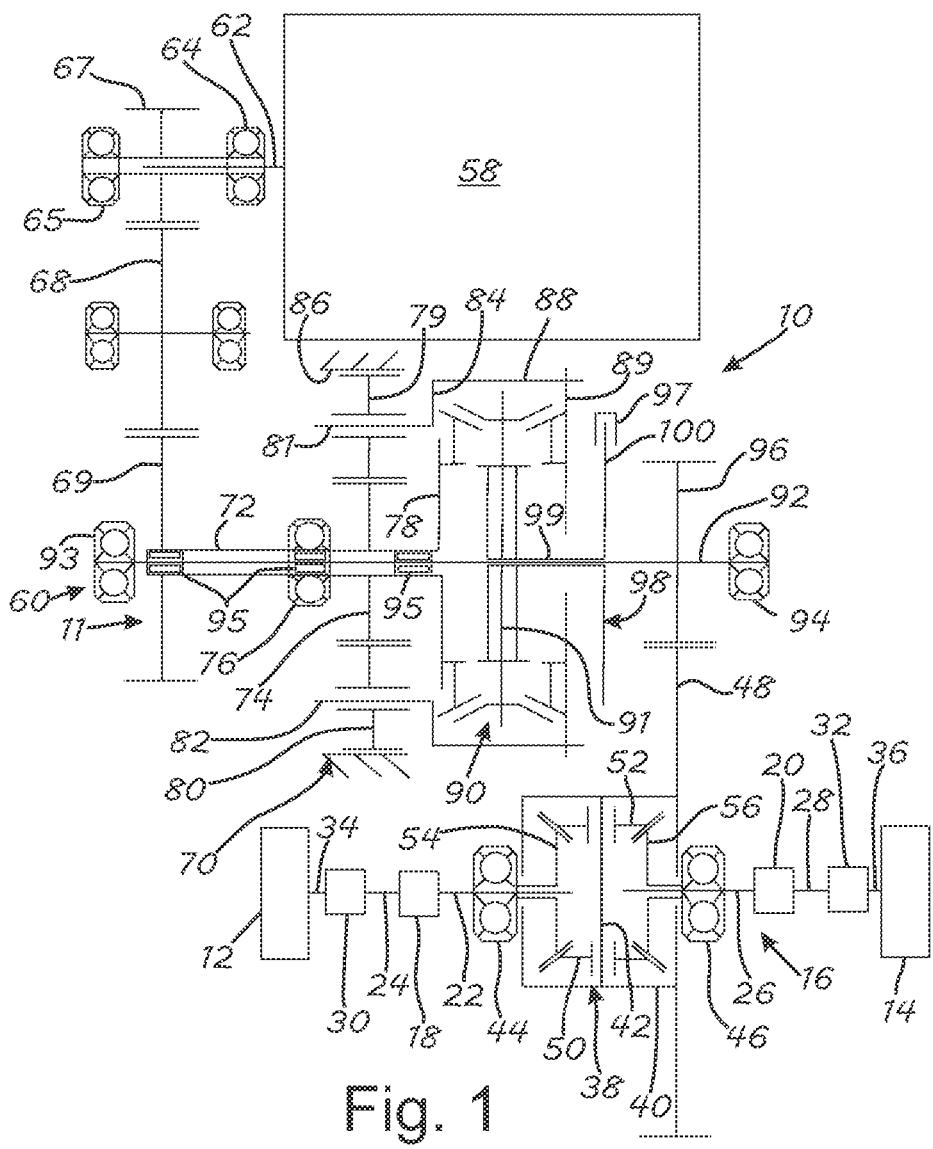
FIG. 1 is a schematic illustration of a product showing part of a vehicle powertrain according to a number of variations.

The following description of the variations is merely illustrative in nature and is in no way intended to limit the scope of the invention, its application, or uses.

In a number of variations as illustrated in FIGS. 1 through 4 wherein like elements have common reference numbers, a product 10 may include an electric all-wheel drive unit 11. The product 10 may include road wheels 12 and 14 which may be connected to an axle assembly 16. The road wheels 12 and 14 may contact the surface upon which a vehicle that may include the product 10 operates. The axle assembly 16 may be included in a vehicle with multiple axle assemblies where one may be driven by a selected power plant such as an internal combustion engine and transaxle or another available option, and another may be driven by the product 10. The axle assembly 16 may include inner joints 18 and 20, which may be constant velocity joints that may transfer rotation and may allow for angular variation between the connected components. The joint 18 may connect an axle shaft 22 with an axle shaft 24. The Joint 20 may connect an axle shaft 26 with an axle shaft 28. The axle shafts 24 and 28 may be connected with outer joints 30 and 32 respectively, which may be constant velocity joints and may be connected to the road wheels 12 and 14, respectively, which may occur through axle shafts 34 and 36.

In a number of variations the axle assembly 16 may include a differential unit 38. The differential unit 38 may include a cage 40 and may have a pinion shaft 42 that may be engaged at each of its ends with the cage 40. The cage 40 may be rotatable and may be carried by bearings 44 and 46. A gear 48 may be engaged with, or fixed to, the cage 40 to rotate therewith, and may serve as the input and output element for the axle assembly 16. The gear 48 may be a helical gear to provide smooth and quiet operation. The pinion shaft 42 may carry a pinion gear 50 and a pinion gear 52, each of which may be rotatable on the pinion shaft 42. A side gear 54 may mesh with each of the pinion gears 50, 52 and another side gear 56 may mesh with each of the pinion gears 50, 52. Rotation of the cage 40 may cause the pinion gears 50, 52 to rotate, which may cause the side gears 54, 56 to rotate.

In a number of variations the axle shaft 22 may have an end that may be engaged with the side gear 54 to rotate therewith and may have its opposite end engaged with the inner joint 18. The axle shaft 26 may have an end that may be engaged with the side gear 56 to rotate therewith and may have its opposite end engaged with the inner joint 20. Rotation of the gear 48 may cause the cage 40 to rotate and through the pinion gears 50, 52 and the side gears 54, 56, may cause the axle shafts 22 and 26 to rotate driving the road wheels 12 and 14. When input may be provided from the road wheels 12 and 14, the axle shafts 22 and 26 may cause the side gears 54, 56 to rotate, which may rotate the pinion gears 50, 52, the cage 40 and the gear 48.

In a number of variations an electrical machine 58 may be connected with the axle assembly 16 through a power transfer unit 60. A housing assembly 61 (shown in FIG. 4), may extend around the electrical machine 58, the power transfer unit 60 and the differential unit 38 and may contain a lubricant such as oil. The electrical machine 58 may be a motor or may be a motor-generator, or may be another type of electrical machine to provide power to the axle assembly 16 through the power transfer unit 60. A shaft 62, which may be a rotor shaft may extend from the electrical machine 58 and may be supported by bearings 64 and 65. A gear 67, which may be a helical gear may be fixed on the shaft 62 to rotate therewith and may be engaged with the power transfer unit 60.

Figure 4:
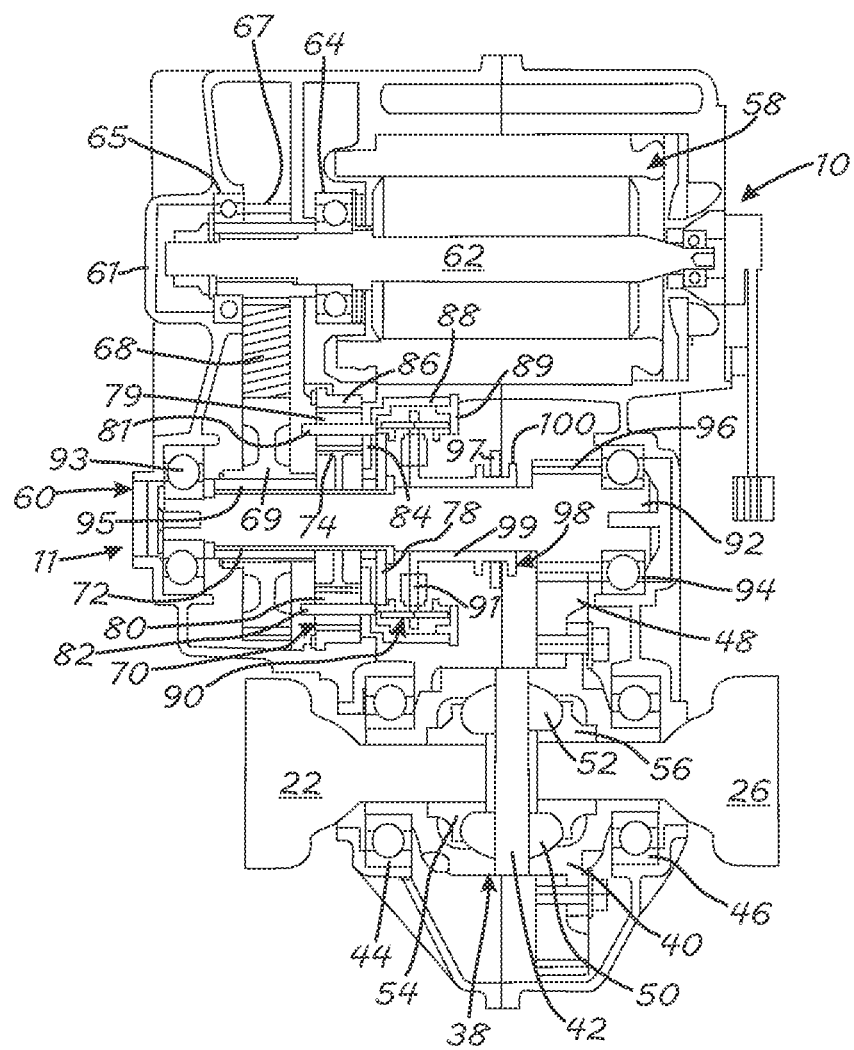
FIG. 4 is an outline illustration of a cross section of an electric all-wheel drive unit according to a number of variations.

In a number of variations the gear 67 may mesh with, and may be positively engaged to rotate with, a gear 68. The gear 68 may be a helical gear and may have a larger diameter than the gear 67 to provide a reduction there between from the shaft 62. The gear 68 may mesh with, and may be positively engaged to rotate with, a gear 69, which may also be a helical gear. The gear 68 may be an idler gear that may be engaged between the gears 67 and 69 and may rotate about a center that is offset behind the plane of the view in FIG. 4. This may allow the shaft 62 to be positioned close to the power transfer unit 60 to minimize both the space between the gears 67 and 69 and packaging space requirements. The gear set 67, 68, 69 may be a helical gear set to provide ease of lubrication at high speed, because, as seen in FIG. 4, the gears 67, 68, 69 are relatively large and open as compared to a planetary gear set. The gears 67, 68 and 69 may be aligned in a parallel configuration, meaning they rotate around parallel axes. The gear 69 may be connected with a torque transfer element 72 that may be tubular in shape and may be supported by bearings 76. The torque transfer element 72 may connect with and may be positively engaged to rotate with a torque transfer element 78 that may extend radially outward from the tubular torque transfer element 72.

In a number of variations the torque transfer element 72 may connect with, and may be positively engaged to rotate with a gear 74, so that the torque transfer element 78 and the gear 74 rotate in unison through the torque transfer element 72. The gear 74 may be a sun gear in a gear set 70, which may be a planetary gear set. The gear 74 may mesh with, and may be positively engaged to rotate with gears 79 and 80. The gears 79, 80 may be planet gears and another number may be provided and may be engaged with the gear 74. The gears 79, 80 may rotate on pins 81 and 82, respectively, which may be fixed to a carrier 84. The gears 79, 80 may mesh with and may be positively engaged to rotate relative to a gear 86 which may be a ring or annulus gear and may include internal teeth. The gear 86 may be held or grounded to the housing assembly 61 so that it may be fixed from rotation. Rotation of the gear 74 may cause the gears 79, 80 to rotate and to walk around the inside of the gear 86 which may cause the carrier 84 to rotate. All of the gear 69, the torque transfer element 72, the gear 74 and the torque transfer element 78 may rotate together in unison. The carrier 84 may be connected to or formed with a torque transfer element 88 and may rotate therewith, and the torque transfer element 88 may be engaged with, or fixed to, a torque transfer element 89.

In a number of variations an engagement mechanism 90 may include an engagement element 91 that may be fixed to rotate with a shaft 92. The shaft 92 may be supported for rotation by bearings 93, 94 and may extend through the torque transfer element 72, the gear 69, and through the gear set 70 and the engagement mechanism 90. The shaft 92 may be positioned in the power transfer unit 60 so as to be disposed parallel to the shaft 62 and to the shafts 22, 26 to provide efficient packaging within the housing 61. A number of bearings 95 may be provided between the torque transfer element 72 and the shaft 92 for relative rotation therebetween. A gear 96 may be fixed with the shaft 92 to rotate therewith and may mesh with, and may be positively engaged to rotate with, the gear 48 to drive, or be driven by, the axle assembly 16. The gears 96 and 48 may be helical gears and the gear 48 may have a larger diameter and a greater number of teeth than the gear 96 to provide a reduction from the gear 96 to the gear 48.

Figure 2:
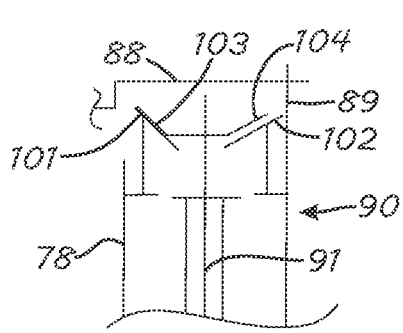
FIG. 2 is a schematic illustration of part of a product showing an engagement mechanism according to a number of variations.
Figure 3:
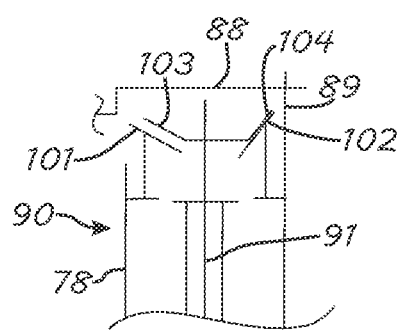
FIG. 3 is a schematic illustration of part of a product showing an engagement mechanism according to a number of variations.

The engagement element 91 may selectively connect and disconnect the driven gear set 70 from the shaft 92 to provide a neutral mode as shown in FIG. 1, and two operative modes of power transmission as shown in FIGS. 2 and 3. The engagement element 91 may be selectively shifted to the left (in the perspective of FIG. 1), as shown in FIG. 2 by a shift member 97, which may be a shift fork, to selectively connect the gear set 70 with the shaft 92 with output from the gear 74 and its connected torque transfer element 78. The engagement element 62 may be selectively shifted to the right (in the perspective of FIG. 1), as shown in FIG. 3 by the shift member 97 to connect the gear set 70 with the shaft 92 with output from the carrier 84 and its connected torque transfer elements 88, 89. When input may be provided from the gear 74 to the shaft 92, rotational speed from the torque transfer element 72 may be maintained for a high range mode of operation. When input may be provided from the carrier 84 to the shaft 92, rotational speed from the torque transfer element 72 may be reduced and torque may be increased for a low range mode of operation.

In a number of variations the shift member 97 may be moved by an actuator (not shown), of a type known in the art, which may be a mechanical, electrical, magnetic, fluid, or another type of actuator, or a combination thereof. In a number of variations the shift member 97 may be engaged with the engagement element 91 through an axial actuating element 98. The axial actuating element 98 may include an axially extending section 99 that may be tubular in shape and may be engaged with the shaft 92 to rotate therewith and configured to slide thereon. For example, the internal surface of the axially extending section 99 may be provided with a keyway or grooves or another feature that mates with a key or ridges or another feature on the exterior surface of the shaft 92 as one skilled in the art would understand. The axially extending section 99 may be connected to, or formed with, the engagement element 91. The axial actuating element 98 may include a radially extending section 100 that may be connected to, or formed with, the axially extending section 99, so that axial translation of the shift member 97 results in axial translation of the engagement element 91.

In a number of variations the engagement mechanism 90 may include the engagement element 91, which may be the hub of a dual cone type synchronizing clutch or synchronizer. Range selection may be performed by the actuator that may move the shift member 97 to move the engagement element 91 axially on the shaft 92. With reference to FIGS. 2 and 3, the engagement mechanism 90 may include reaction rings 101 and 102 that may be fixed to the respective torque transfer element 78 and the torque transfer element 89. A blocker ring 103 may be positioned between the reaction ring 101 and the engagement element 91, and a blocker ring 104 may be positioned between the reaction ring 102 and the engagement element 91. Friction material may be carried between corresponding mating surfaces of the blocker rings and reaction rings. The shift member 97 may be moved to result in a transfer of torque between the engagement element 91 and the torque transfer element 78 by engaging the blocker ring 103 with the reaction ring 101 as shown in FIG. 2. The shift member 97 may center the engagement element 91 for neutral as shown in FIG. 1. The shift member 97 may be moved to result in a transfer of torque between the engagement element 91 and the torque transfer element 89 by engaging the blocker ring 104 with the reaction ring 102 as shown in FIG. 3.

Through the foregoing variations a vehicle may be provided with an axle assembly 16 that may be driven by an electrical machine 58 to provide electric all-wheel drive. The vehicle may be equipped with a second axle assembly driven by a conventional power plant to accomplish all-wheel drive. The axle assembly 16 may drive the electrical machine 58 to provide regenerative braking to charge the vehicle's battery. In addition, the axle assembly 16 may be driven by the electrical machine 58 to provide improved traction and vehicle dynamics. In particular, the axle assembly 16 may provide electric drive with improved torque in a low voltage system, such as a 48 volt system. The axle assembly 16 may be the rear axle in a front-wheel drive vehicle, the front axle in a rear-wheel drive vehicle, or another arrangement or a combination of propulsion sources may be used. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include an axle assembly with an electrical machine that may be interconnected with the axle assembly. A power transfer unit may be connected between the electrical machine and the axle assembly. The power transfer unit may include a planetary gear set and may include an engagement mechanism that in combination may provide a low range, a neutral mode and a high range between the electrical machine and the axle assembly. A first gear set may be engaged between the electrical machine and the power transfer unit and a second gear set may be engaged between the power transfer unit and the axle assembly.

Variation 2 may include the product according to variation 1 wherein the first and second gear sets may comprise helical gears.

Variation 3 may include the product according to variation 1 or 2 wherein the electrical machine may include a rotor and a connected first shaft. The power transfer unit may include a second shaft that may extend through the planetary gear set and the engagement mechanism. The axle assembly may include a third shaft.

Variation 4 may include the product according to variation 3 wherein the first, second and third shafts may all be disposed parallel with one another.

Variation 5 may include the product according to variation 4 and may include a differential unit and a joint. The third shaft may extend between the differential unit and the joint.

Variation 6 may include the product according to any of variations 1 through 5 wherein the first gear set may include a first gear connected to the electrical machine, a second gear connected to the planetary gear set, and a third gear positively engaged to rotate with, and extending between, the first and second gears.

Variation 7 may include the product according to any of variations 1 through 6 wherein the planetary gear set may include a sun gear and wherein the low range may be provided when the engagement mechanism connects the sun gear with the axle assembly.

Variation 8 may include the product according to any of variations 1 through 7 wherein the planetary gear set may include a carrier and wherein the high range may be provided when the engagement mechanism connects the carrier with the axle assembly.

Variation 9 may involve a product that may include an axle assembly, a road wheel driven by the axle assembly, and a gear driving the axle assembly. A power transfer unit may include a planetary gear set and an engagement mechanism. An electrical machine may be connected with the axle assembly through the power transfer unit. A housing assembly may cover at least a part of each of the axle assembly, the power transfer unit, and the electrical machine.

Variation 10 may include the product according to variation 9 wherein a first gear set may connect the electrical machine with the power transfer unit.

Variation 11 may include the product according to variation 10 wherein a second gear set may connect the power transfer unit with the axle assembly.

Variation 12 may include the product according to any of variations 9 through 11 wherein the engagement mechanism may be shiftable between a high range position, a low range position, and a neutral position.

Variation 13 may include the product according to variation 12 wherein the engagement mechanism may include an engagement element. An actuating element may be connected to, and may move, the engagement element. The actuating element may have an axially extending section that may be tubular in shape. A shaft may extend through the axially extending section, and may carry the gear.

Variation 14 may include the product according to variation 13 wherein the actuating element may have a radially extending section that may extend radially outward from the axially extending section. A shift member may engage the radially extending section.

Variation 15 may involve a product that may include a pair of axle shafts. A power transfer unit may provide power to the pair of axle shafts. A differential unit may provide a connection between the pair of axle shafts and the power transfer unit. An electrical machine may be connected to the power transfer unit. The power transfer unit may have a helical gear input from the electric machine and a helical gear output to the differential unit. The power transfer unit may have a planetary gear set and an engagement mechanism that may provide a high range mode, a low range mode, and a neutral mode between the helical gear input and the helical gear output.

What is claimed is:

1. A product comprising an axle assembly, an electrical machine interconnected with the axle assembly, a power transfer unit connected between the electrical machine and the axle assembly the power transfer unit comprising a planetary gear set and an engagement mechanism that in combination provide a low range, a neutral mode and a high range between the electrical machine and the axle assembly, and comprising a first gear set engaged between the electrical machine and the power transfer unit and a second gear set engaged between the power transfer unit and the axle assembly, wherein the engagement mechanism is connected to the planetary gear set directly through a torque transfer element that is fixed directly to the planetary gear set and that is fixed directly the engagement mechanism.

2. The product according to claim 1 wherein the first and second gear sets comprise helical gears.

3. The product according to claim 1 wherein the electrical machine includes a rotor and a connected first shaft, the power transfer unit includes a second shaft that extends through the planetary gear set and the engagement mechanism, and the axle assembly includes a third shaft.

4. The product according to claim 3 wherein the first, second and third shafts are all disposed parallel with one another.

5. The product according to claim 4 further comprising a differential unit and a joint, wherein the third shaft extends between the differential unit and the joint, and wherein the second gear set comprises a first gear fixed to rotate with the second shaft and the second gear set comprises a second gear fixed to rotate with the differential unit.

6. The product according to claim 1 wherein the first gear set includes a first gear connected to the electrical machine, a second gear connected to the planetary gear set, and a third gear positively engaged to rotate with, and extending between the first and second gears, and comprising a hollow tubular shaft fixed to the second gear, to the planetary gear set, and to the engagement mechanism.

7. A product comprising an axle assembly, an electrical machine interconnected with the axle assembly, a power transfer unit connected between the electrical machine and the axle assembly the power transfer unit comprising a planetary gear set and an engagement mechanism that in combination provide a low range, a neutral mode and a high range between the electrical machine and the axle assembly, and comprising a first gear set engaged between the electrical machine and the power transfer unit and a second gear set engaged between the power transfer unit and the axle assembly, wherein the planetary gear set includes a sun gear and wherein the low range is provided when the engagement mechanism connects the sun gear with the axle assembly.

8. The product according to claim 7 wherein the planetary gear set includes a carrier and wherein the high range is provided when the engagement mechanism connects the carrier with the axle assembly.

9. The product according to claim 1 wherein the electric machine includes a first shaft and the axle assembly includes a second shaft and comprising a third shaft disposed between the first and second shafts and wherein the planetary gear set and the engagement mechanism each rotates around the third shaft which serves as an axis of rotation for the planetary gear set and the engagement mechanism.

10. The product according to claim 9 wherein the engagement mechanism comprises an engagement element fixed to rotate with the third shaft.

11. The product according to claim 1 wherein the planetary gear set includes a sun gear, a ring gear, and a set of planetary gears engaged between the sun gear and the ring gear and a carrier carrying the planet gears, and comprising a first torque transfer element fixed to the engagement mechanism and fixed to rotate with the sun gear and comprising a second torque transfer element fixed to the engagement mechanism and fixed to rotate with the carrier.

12. The product according to claim 1 comprising a differential unit with a cage surrounding a number of gears, wherein the second gear set includes a first gear fixed to the power transfer unit and a second gear fixed to the cage.

13. The product according to claim 12 comprising a housing assembly defining an interior area that is contiguous, wherein the electric machine, the power transfer unit and the differential are contained in the interior area.

* * * * *